United States Patent
Gordt et al.

(10) Patent No.: US 11,093,029 B2
(45) Date of Patent: Aug. 17, 2021

(54) POSITION DETERMINATION AND ALIGNMENT OF A VIRTUAL REALITY HEADSET AND FAIRGROUND RIDE WITH A VIRTUAL REALITY HEADSET

(71) Applicant: VR Coaster GmbH & Co. KG, Kaiserslautern (DE)

(72) Inventors: Dennis Gordt, Sexau (DE); Michael Heyse, Kaiserslautern (DE)

(73) Assignee: VR Coaster GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 16/124,965

(22) Filed: Sep. 7, 2018

(65) Prior Publication Data

US 2019/0004598 A1  Jan. 3, 2019

Related U.S. Application Data

(63) Continuation-in-part of application No. PCT/EP2017/055571, filed on Mar. 9, 2017.

(30) Foreign Application Priority Data

Mar. 9, 2016 (DE) .................... 10 2016 104 337.0

(51) Int. Cl.
*G06F 3/01* (2006.01)
*A63G 7/00* (2006.01)
(Continued)

(52) U.S. Cl.
CPC .............. *G06F 3/012* (2013.01); *A63G 7/00* (2013.01); *A63G 31/16* (2013.01);
(Continued)

(58) Field of Classification Search
CPC .......... G06F 3/012; G06F 1/163; G06F 3/011; G06F 3/147; A63G 31/16; A63G 7/00;
(Continued)

(56) References Cited

U.S. PATENT DOCUMENTS 5,662,523 A * 9/1997 Yasumaru ............... A63F 13/12
463/30
6,179,619 B1 1/2001 Tanaka
(Continued)

FOREIGN PATENT DOCUMENTS

DE 102014111386 2/2016
EP 0691146 1/1996
(Continued)

OTHER PUBLICATIONS

World Intellectual Property Organization, "International Search Report," and English translation thereof, issued in International Application No. PCT/EP2017/055571, dated May 24, 2017, document of 7 pages.
(Continued)

*Primary Examiner* — David D Davis
(74) *Attorney, Agent, or Firm* — Akerman LLP; Peter A. Chiabotti

(57) ABSTRACT

A method for determining a position and to a method for aligning at least one virtual reality headset in amusement rides. The virtual reality headset is a mobile virtual reality headset and has at least one receiver or at least one apparatus. The receiver receives a position signal of a position transmitter as a received signal, and the apparatus receives an alignment signal of an alignment transmitter. The disclosure additionally relates to an amusement ride with which a method according to the disclosure can be carried out.

20 Claims, 4 Drawing Sheets

(51) Int. Cl.

| | | |
|---|---|---|
| *A63G 31/16* | (2006.01) | |
| *G06F 1/16* | (2006.01) | |
| *G09G 5/00* | (2006.01) | |
| *G06F 3/147* | (2006.01) | |
| *G06T 7/73* | (2017.01) | |
| *G02B 27/01* | (2006.01) | |

(52) U.S. Cl.
CPC ......... *G02B 27/0172* (2013.01); *G06F 1/163* (2013.01); *G06F 3/011* (2013.01); *G06F 3/147* (2013.01); *G06T 7/74* (2017.01); *G09G 5/00* (2013.01); *G02B 2027/014* (2013.01); *G02B 2027/0138* (2013.01); *G02B 2027/0187* (2013.01); *G06T 2207/30204* (2013.01); *G06T 2219/2004* (2013.01)

(58) Field of Classification Search
CPC ... G09G 5/00; G06T 7/74; G06T 2207/30204; G06T 2219/2004; G02B 27/0172; G02B 2027/0138; G02B 2027/014; G02B 2027/0187
See application file for complete search history.

(56) References Cited

U.S. PATENT DOCUMENTS

| | | | |
|---|---|---|---|
| 2010/0240454 A1* | 9/2010 | Xiao | A63G 21/20 463/30 |
| 2010/0305724 A1* | 12/2010 | Fry | A63F 13/10 700/92 |
| 2011/0141246 A1 | 6/2011 | Schwartz et al. | |
| 2015/0190726 A1* | 7/2015 | Frolov | A63F 13/837 472/61 |
| 2015/0235426 A1* | 8/2015 | Lyons | G02B 27/0172 345/8 |
| 2015/0269780 A1 | 9/2015 | Herman et al. | |
| 2015/0370067 A1* | 12/2015 | Denduluri | G02B 27/0101 345/8 |
| 2016/0005233 A1* | 1/2016 | Fraccaroli | G02B 27/0172 345/633 |
| 2016/0048203 A1* | 2/2016 | Blum | G06F 3/012 104/84 |
| 2016/0070109 A1* | 3/2016 | Mullins | G02B 27/0176 359/630 |
| 2016/0162012 A1* | 6/2016 | Chang | G06F 1/3265 345/211 |
| 2016/0227868 A1* | 8/2016 | Mullins | A42B 3/221 |
| 2016/0346704 A1* | 12/2016 | Wagner | G06T 19/006 |

FOREIGN PATENT DOCUMENTS

| | | |
|---|---|---|
| EP | 2138213 | 12/2009 |
| JP | 2001062154 | 3/2001 |
| JP | 2012226666 | 11/2012 |
| WO | 9831444 | 7/1998 |

OTHER PUBLICATIONS

German Patent Office, "Office Action," issued in German Patent Application No. 10 2016 104 337.0, dated Dec. 6, 2016, document of 12 pages.

Bhatnagar, "Position trackers for Head Mounted Display systems: A survey," University of North Carolina, Chapel Hill, Mar. 29, 1993, 22 pages.

Shin et al., "Integration of a Precise Indoor Position Tracking Algorithm with an HMD-Based Virtual Reality System," In: Proceedings of the 2nd ACM International Workshop on Immersive Media Experiences, ACM, 2014, pp. 23-26.

Japanese Patent Office, "Notice of Reasons for Refusal," and English translation thereof, issued in Japanese Patent Application No. 2018-545889, dated Jul. 2, 2019, document of 14 pages.

* cited by examiner

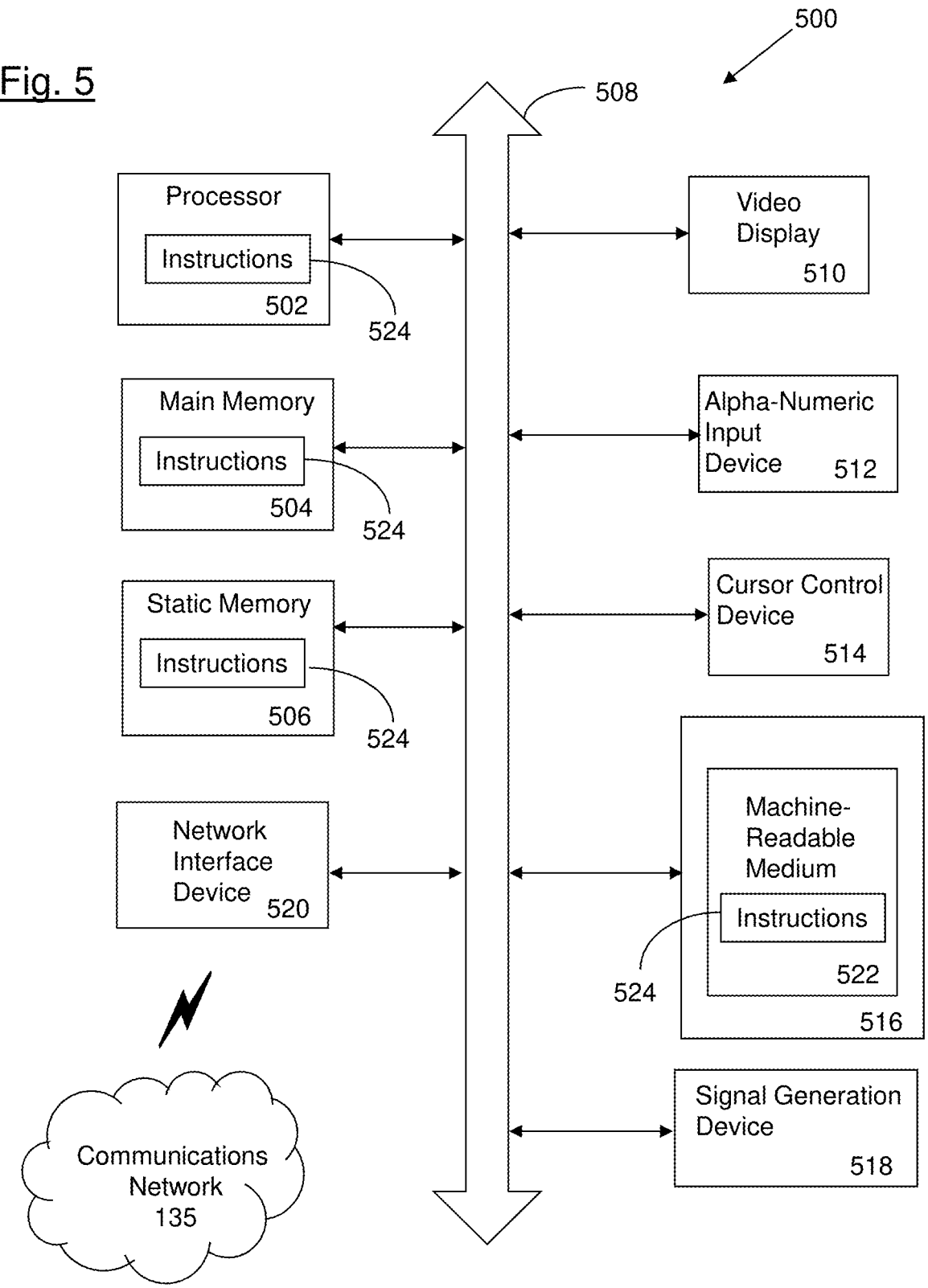

POSITION DETERMINATION AND ALIGNMENT OF A VIRTUAL REALITY HEADSET AND FAIRGROUND RIDE WITH A VIRTUAL REALITY HEADSET

CROSS REFERENCE TO RELATED APPLICATIONS

This application is a Continuation-In-Part Application and claims the benefit of PCT/EP2017/055571, designating the United States, filed Mar. 9, 2017, the entirety of which is herein incorporated by reference and which claims priority to German Patent Application No. DE 10 2016 104 337.0, filed Mar. 9, 2016, which is also herein incorporated by reference.

BACKGROUND

The present disclosure relates to a method for determining the position of at least one virtual reality headset in fairground rides, a method for aligning at least one virtual reality headset, and to a fairground ride, with which a method according to the present disclosure can be carried out.

The term virtual reality denotes here, and in the following disclosure, the representation and simultaneous perception of reality and its physical qualities in an interactive, virtual environment that is computer-generated in real time. A requirement which can be made upon preparing a virtual reality is, for example, the extent by which the perception of one's own person is reduced in the virtual reality and by which the identification with a person in the virtual reality is enlarged. This effect is known as immersion.

In order to generate a feeling of immersion, special output devices are required for representing virtual realities, for example, virtual reality headsets or head-mounted displays which are worn on the head of a passenger.

The main components of such an output device are a display unit and a lens. The display unit supplies the image from a connected data source. The lens guides the image further and projects it in front of the eye. The display unit and the lens can be integrated in a pair of glasses or in a data helmet or the like.

Fairground rides are known in which the passenger wears a virtual reality headset during a trip on which a virtual reality of the trip synchronized with the trip is displayed.

For example, JP 2001062154 A describes a helmet with a pair of glasses and a headphone as a head-mounted display for representing image information and audio information, which helmet is to be worn by a passenger of a roller coaster during the travel. A virtual reality is blended into this pair of glasses and the associated audio information is generated via the headset.

EP 2 138 213 B1 discloses a method in which a virtual reality of a trip with a roller coaster is displayed on a pair of glasses to be worn by a passenger and with a head-mounted display. Here, a receiving device records an image of the optical reality which can be perceived from the vehicle. An apparatus generates visual impressions which alter the perception of reality. Furthermore, the fairground ride comprises an element which generates a total image from the visual impressions generated by the device and from the image recorded by the receiving device and displays additional visual impressions which are merged in or mixed in.

During a trip through a virtual reality it is decisive that the virtual reality headset, which represents the virtual reality, is positioned and aligned in such a manner that that the movement of the passenger in the virtual reality is synchronized as well as possible with the real movement in actual reality.

In the known methods, e.g., in a roller coaster train, the position of the virtual reality headset worn by the passenger is determined by the seat row occupied by the passenger. Each virtual reality headset is associated here with a certain seat row. Such a method is disclosed, for example, in U.S. Pat. No. 6,179,619 B1. Therefore, the virtual reality headset can be used here for a given seat row. This determination of position requires an elevated expense of coordination for the operator of the fairground ride. Care must be taken that the virtual reality headsets are mounted and connected in the correct particular seat row.

Moreover, it is known how to transmit the number of the seat row to the virtual reality headset during the entering by radio frequencies or near field communication chips on or next to the concerned vehicle of the fairground ride. However, this method requires for the determination of the position of the virtual reality headset an additional processing step which can also be forgotten.

In actual reality, a fixed, given direction and with it an alignment can usually be determined by a compass. For example, the magnetic direction north can be determined with a magnetic compass. Since no magnetic compass for the alignment of the virtual reality can be used in a typical roller coaster environment due to the numerous steel elements and electromotors, in the past the virtual reality had to be manually aligned, for example, in that the passenger did not put the virtual reality headset on until seated in the vehicle and was looking exactly straight ahead on the instruction of the operator. In this case, a height axis of the passenger coincides with a vertical direction so that the operator can bring the alignment of the virtual reality into coincidence with the alignment of the actual reality. The normal axis is the vertical axis in the reference system that is firmly connected to the passenger. The vertical direction is defined in the reference system of the earth and faces the center of the earth. Alternatively, the virtual reality can also be aligned by pressing a button while looking straight ahead. However, even a slight deviation from the straight-ahead direction can result in an erroneous alignment of the virtual reality, which can initiate feelings of dizziness and nausea in the passenger.

SUMMARY

Therefore, the present disclosure makes available a method for the determination of the position and the alignment of a virtual reality headset. In addition, the present disclosure makes available a fairground ride, in particular a roller coaster, with one or more virtual reality headsets whose determination of position and alignment take place. In particular, a high degree of flexibility and any desired possibilities of use regarding the virtual reality headset used should be possible in the method according to the present disclosure and in the associated fairground ride.

The methods disclosed herein have the features and structures recited herein and provide a fairground ride having the features and structures recited herein.

Advantageous embodiments and further developments of the present disclosure are recited herein.

In the method according to the present disclosure for determining the position of at least one virtual reality headset in at least one vehicle moving along a driving stretch of a fairground ride and which receives at least one passenger, the virtual reality headset is placed on his head during a ride with the fairground ride. During an operation of the fairground ride in actual reality, a virtual reality corresponding to the ride with the vehicle is generated and represented on the virtual reality headset. The fairground ride comprises at least one position sensor from which at least one position signal emanates.

In certain embodiments of the present disclosure, the virtual reality headset is a mobile virtual reality headset, and the virtual reality headset comprises at least one receiver which evaluates the position signal of the position sensor for the determination of the position of the virtual reality headset in the vehicle relative to the position sensor. Furthermore, the virtual reality headset comprises according to the present disclosure a detachable and/or wireless communication interface via which a data connection takes place between the virtual reality headset and a data processing device of the fairground ride.

Here and in the following description, the concept data connection designates a two-sided data transmission, i.e., a data transfer from the data processing device to the virtual reality headset and a data transfer from the virtual reality headset to the data processing device, as well as a one-sided data transmission, for example, only from the data processing device to the virtual reality headset.

In the case of a roller coaster with seat rows distributed onto individual carriages serving as a vehicle, a first passenger can sit down in a seat row in the front as regards a direction of travel, and a second passenger can sit down in a back seat row. The first and the second passenger receive the positioning signal based on the different seat row as different first and second received signals. For example, the amplitude, frequency or strength of the first received signal can be different from that of the second received signal. The virtual reality headset can then automatically determine the seat row with which it is associated from a comparison of the amplitudes, frequencies, strengths or other signal magnitudes of the particular received signals with those of the original position signal. Therefore, the determination of the position of the virtual reality headset in the fairground ride takes place automatically.

The operator of the fairground ride, for example of a roller coaster, can advantageously save calculating time for the determination of position with a virtual reality headset which can automatically determine its position by itself. In distinction to the known method in which each virtual reality headset transmits its position signals to a calculating unit of the fairground ride in which its position must be first calculated for each individual virtual reality headset, with the virtual reality headset according to the present disclosure the position is already completely calculated as a result and is transmitted via a detachable or wireless communication interface to a data processing device of the fairground ride. This can save calculating time for the data processing device.

For the case that the virtual reality is generated by an application software, in particular a mobile app, in the virtual reality headset, the data processing device can transmit a starting and/or stopping signal of the travel with the vehicle via the communication interface to the virtual reality headset. In this manner, the mobile app and therefore the travel in the virtual reality starts and/or ends synchronously with the start and/or stop of the travel with the vehicle in actual reality.

The mobile virtual reality headset according to the present disclosure also has advantages for the passenger. Thus, the passenger can also put on the mobile virtual reality headset, which is not permanently fixed in a vehicle, even outside of the vehicle and use it, for example in the waiting station of a roller coaster or even outside of the fairground ride.

The method according to the present disclosure for aligning at least one virtual reality headset in at least one vehicle moving along a travel stretch of the fairground ride and which receives at least one passenger on which the virtual reality headset was set during a ride with the vehicle, wherein during an operation of the fairground ride in actual reality a virtual reality corresponding to the ride with the vehicle is generated and represented on the virtual reality headset, wherein the fairground ride comprises at least one alignment sensor from which at least one alignment signal emanates, wherein the virtual reality headset is a mobile virtual reality headset, the virtual reality headset comprises at least one apparatus which evaluates the alignment signal of the alignment sensor for the determining of the alignment of the virtual reality headset in the virtual reality relative to the alignment sensor, and that the virtual reality headset comprises a detachable and/or wireless communication interface via which a data connection takes place between the virtual reality headset and the data processing device of the fairground ride.

The alignment signal can be, for example, reflections of any image, in the simplest case of a line or of a barcode which is arranged on the fairground ride and is therefore simultaneously also the alignment sensor. The image of the apparatus of the virtual reality headset is perceived from a different perspective as a function of the vertical axis which faces, for example, in a different direction relative to the vertical direction according to an assumed inclination of the passenger's head. Using the perspective under which the alignment signal is perceived by the apparatus of the virtual reality headset, the alignment of the vertical axis of the virtual reality headset relative to a vertical direction can then be determined automatically. In this manner the virtual reality headset recognizes automatically in which direction the real north pole is in comparison to a virtual north pole without the passenger having to look exactly straight ahead for such an alignment.

The operator of a fairground ride, for example, of a roller coaster, can advantageously save calculating time for the determination of the alignment with a virtual reality headset which can determine its alignment itself. In distinction to the known methods, in which each virtual reality headset transmits its alignment signals to a calculating unit of the fairground ride in which the alignment for each individual virtual reality headset must first be calculated, with the virtual reality headset according to the present disclosure the alignment already completely calculated as a result is transmitted via a detachable or wireless communication interface to a data processing device of the fairground ride.

This can save calculating time for the data processing device.

The mobile virtual reality headset also has advantages for the passenger. Thus, the passenger can also put on the mobile virtual reality headset, which is not permanently fixed in a vehicle, even outside of the vehicle and use it, for example in the waiting station of a roller coaster or even outside of the fairground ride.

The method for the determination of the position is preferably combined with the method for the alignment of the virtual reality headset. In this manner the virtual reality headset can simultaneously recognize where it is located in the fairground ride and how it is aligned with the actual reality.

A sensor which is a position sensor and at the same time an alignment sensor is especially preferred. In this manner the position and the alignment can be determined with one sensor. For example, each seat row of a vehicle can be associated with a barcode with a different number, distribution and/or form of lines by which a seat row can be coded by the number, distribution and/or form of lines. A conclusion can then be made about the position in a certain seat row from the particular barcode. The alignment of the virtual reality headset is then also determined according to the assumed perspective of the particular barcode.

The fairground ride advantageously comprises at least three, and, in certain embodiments, preferably at least eight position sensors. The position of the virtual reality headset in the fairground ride can be determined with three position sensors, e.g., by triangulation or trilateration. The three position sensors can also emit their current position and the exact clock time at a given time intervals. The receiver of the virtual reality headset can calculate its own position from the particular received signals. This example is analogous to the satellite navigation method GPS. In addition, even run times can be measured from the position signal with which a speed of the virtual reality headset can be determined.

It is also within the scope of the present disclosure that the speed of the vehicles is measured, for example, with speed sensors mounted on the vehicle. The measured speed is transmitted via the communication interface to the virtual reality headset. In this manner the speed of the ride in the virtual reality can be synchronized with the speed in actual reality.

The advantage of using several position sensors is that a redundant system can be realized. The excess position sensors can serve as replacement for a down position sensor.

In a preferred embodiment of the present disclosure the position signals are Bluetooth, WLAN, optical, preferably infrared, quick response codes or barcodes, magnetic, a combination of the above-cited signals or other radio signals. In particular, when using Bluetooth transmitting signals the known Bluetooth low energy technology can be used, which operates with an extreme savings of current. Small transmitters, so-called Bluetooth beacons, are placed here in space and serve as position sensors which transmit position signals at fixed time intervals. If the receiver of a virtual reality headset comes in the range of a Bluetooth beacon the signal strength of the received signal can be measured. In the case of at least three Bluetooth beacons in the range of the receiver the position of the receiver can be calculated in two-dimensional space by trilateration. Four Bluetooth beacons in range are needed for determining a location in a three-dimensional space.

In another preferred embodiment of the present disclosure the alignment signals are optical, preferably infrared, quick response codes or barcodes. It can advantageously be readily recognized in which direction the virtual reality headset is aligned by the perspective perceiving of, for example, a quick response code.

In an advantageous embodiment of the present disclosure the position sensor and/or the alignment sensor are arranged on a stationary position of the fairground ride and/or on the vehicle. For example, in a roller coaster the position sensor and the alignment sensor are arranged on the waiting station of the roller coaster.

In particular, at least one camera is integrated in the virtual reality headset. The camera can serve as an apparatus for detecting the alignment signal. A recognition of seats and an alignment of the virtual reality headset can be determined in a relatively simple manner with a camera. It is sufficient for this to place quick response codes, barcodes or another optical signal in a waiting station or in a vehicle of a roller coaster which is determined by the camera of the virtual reality headset. The position and the alignment of the virtual reality headset used can then be determined from the position, perspective, code contents or also from the signal brightness. For example, the camera integrated in a smartphone can serve as camera, wherein the smartphone is set into the virtual reality headset, such as in a receptacle of the virtual reality headset.

According to a further development of the present disclosure, a mobile terminal 102 (e.g. first user device 102) or other computing device, preferably a mobile radio device or a mobile telephone, in particular a smartphone, a tablet computer or the like can be set into the virtual reality headset. The mobile terminal 102 can also be permanently built into the virtual reality headset 10. A smartphone simultaneously constitutes a receiver for the determination of position and, by the integrated camera, an apparatus for the alignment of the virtual reality headset.

Preferably at least one electrical component of a mobile terminal can be added into the virtual reality headset. It is sufficient, for example, to add only a main board of a smart phone. A main processor, the data memory and a WLAN receiver, among other things, can be arranged on the main board. A keyboard or a touchscreen panel of a smart phone are not required for generating a virtual reality, however, in certain embodiments, may be utilized when generating the virtual reality. As a result, among other things, less space is required and expenses can be reduced in the virtual reality headset.

According to an alternative embodiment of the present disclosure the virtual reality headset comprises at least one marker which emits a tracking signal or functions upon passive action, and the fairground ride comprises at least one tracking apparatus for detecting a movement of the marker, wherein the position and/or the alignment of the virtual reality headset relative to the tracking apparatus is determined using the movement of the marker detected by the tracking apparatus. A data processing system on a stationary part of the fairground ride or on board a vehicle can transmit to every virtual reality headset by radio, for example via Bluetooth or WLAN in which position and in which alignment it is located by such a motion capture system.

The tracking signal is advantageously an optically, magnetic, acoustic signal, or a combination of the previously cited signals. Therefore, a suitable tracking signal can be selected for the particular individual case.

A method such as described above can be performed with a fairground ride according to the present disclosure.

A fairground ride according to the present disclosure, especially a roller coaster, with a travel stretch, at least one vehicle which moves along the travel stretch, at least one position sensor and/or alignment sensor from which at least one position signal or a second alignment signal emanates, at least one virtual reality headset, wherein during an operation of the fairground ride in actual reality a virtual reality corresponding to the travel with the vehicle can be generated and is represented on the virtual reality headset, characterized in that the virtual reality headset is a mobile headset, the virtual reality headset comprises at least one receiver and/or at least one apparatus, the virtual reality headset has a detachable or wireless communication interface via which a data connection takes place between the virtual reality headset and a data processing device of the fairground ride, and that a determination of position and/or an alignment of the virtual reality headset takes place according to the method of the present disclosure for the determination of position and/or for determining the alignment.

The advantages of this method are the automatic determining of the position and the alignment the mobility of the virtual reality headset.

BRIEF DESCRIPTION OF THE DRAWINGS

The present disclosure will be explained in detail using the following figures. In the figures:

FIG. 5 is a schematic diagram of a machine in the form of a computer system within which a set of instructions, when executed, may cause the machine to perform any one or more of the methodologies or operations of the systems and methods for determining the position and alignment of a virtual reality headset as described in the present disclosure.

In the figures the same reference numerals designate the same reference parts with the same meaning. For the sake of clarity, only the particular relevant reference parts are characterized in the figures.

DETAILED DESCRIPTION

Figure 1:
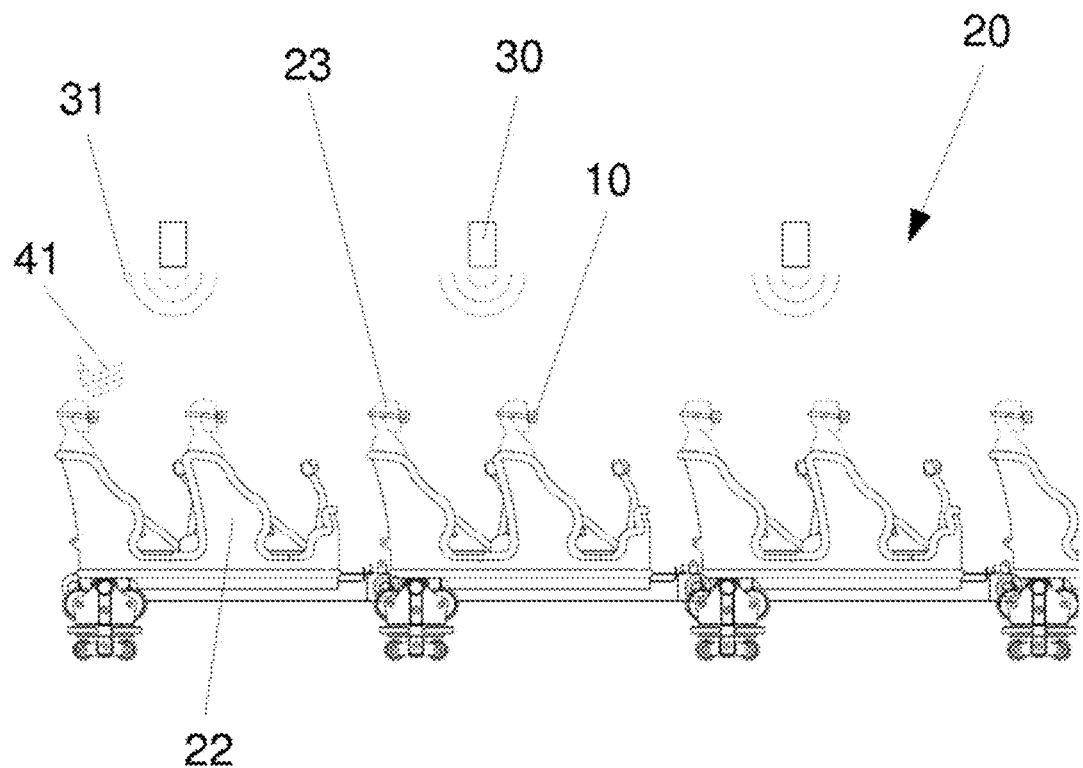
FIG. 1 shows an exemplary embodiment of a fairground ride with passengers wearing a virtual reality headset whose position is being determined.

FIG. 1 shows a side view of a section of a train of a roller coaster as fairground ride 20. Each vehicle 22, i.e., each carriage of the train has two rows of seats in which at least one passenger 23 is sitting. During the travel of the train, each passenger 23 is wearing a virtual reality headset 10 in the form of a virtual reality pair of glasses. However, the present disclosure is not limited to roller coasters. A merry-go-round or some other entertainment attraction in an amusement park or in a fair can also be provided as fairground ride 20. Additionally, the functionality and operative features provided in the present disclosure may also be utilized for any type of vehicle, attraction, ride, boat, flying machine, movable object, or any combination thereof.

Depending on the position of the passenger 23 in the seat row of the train, the alignment of the virtual reality headset 10, and the position of the vehicle 22 on a trip stretch, a virtual reality corresponding to a trip with the vehicle 22 is generated by the virtual reality headset 10 by a computer program or a mobile application, which are specific for the fairground ride 20. The virtual reality headsets 10 may be configured to be mounted to the head of the passenger 23 and may include, but are not limited to including, a head-mounted display (e.g. stereoscopic or other suitable display), stereo sound capabilities and devices, head motion tracking sensors, processors, memories, power sources (e.g. batteries), accelerometers, gyroscopes, scructured light systems, infrared systems, lens, any component of a virtual reality headset, or a combination thereof. The virtual reality can be generated in such a manner that the trip through the virtual reality corresponds to the trip through the actual reality and that a trip experience in the actual reality corresponds to a trip experience in the virtual reality. If the passenger 23 travels in actual reality, for example, through a looping, he then travels in the virtual reality through the same looping. In certain embodiments, the virtual reality headset 10 and the fairground ride 20 may support and/or generate augmented reality content for display via the virtual reality headset 10.

Position sensors 30 are installed on the fairground ride 20, which generate a position signal 31. The position sensors 30 can be, for example, but are not limited to, Bluetooth beacons which emanate Bluetooth signals as position signals 31. The position sensors 30 can be installed on a stationary part of the fairground ride 20, for example in a waiting station of a roller coaster or in the vehicle 22. The position signal 31 is detected by a receiver 40 built into the virtual reality headset 10, see also FIG. 2, as a received signal 41. For example, the position signal 31 can be an optical light signal, preferably in the infrared wavelength range. Infrared signals are not visible for the passenger 23 and are therefore also not perceived as disturbing. Using the brightness of the received signal 41, which is registered by the receiver 40, a distance of the receiver 40 to the particular position sensor 30 can be determined and therefore the position of the virtual reality headset 10 relative to the seat row of the vehicle 22. In certain embodiments, the receiver 40 may be a transceiver, any type of receiver, or a combination thereof.

The exact position of the virtual reality headset 10 in the vehicle 22 is important for the synchronization of the virtual reality with the actual reality. For example, a passenger 23 who sat down in a front seat row relative to a travel direction will perceive the actual reality spatially and chronologically differently than the passenger 23 who sat in a rear seat row of the fairground ride 20 relative to the direction of travel. These different impressions based on the arrangement of seats in the fairground ride 20 must be correctly transferred into the virtual reality for a suitable perception of the virtual reality. To this end, the exact position of the virtual reality headset 10 in the fairground ride 20 is necessary. Therefore, the position of the passenger 23 in the virtual reality can be synchronized with the position of the passenger 23 in the actual reality by the exact determination of the position of the virtual reality headset 10.

However, it is not sufficient for the correct synchronization of the virtual reality with the actual reality to only bring the position of the passenger 23 in the actual reality in coincidence with the position of the passenger 23 in the virtual reality. In addition, the alignment of the passenger 23 in the virtual reality must coincide with the alignment of the passenger 23 in the actual reality. For example, a forward movement in actual reality should not lead to a side movement in virtual reality. In order that a forward movement in actual reality also leads to a forward movement in virtual reality, the alignment of the virtual reality headset 10 in the virtual reality must coincide with the alignment of the virtual reality headset 10 in actual reality. However, the perception of the virtual reality can also be purposefully changed by the occurred alignment of the virtual reality headset 10.

Figure 2:
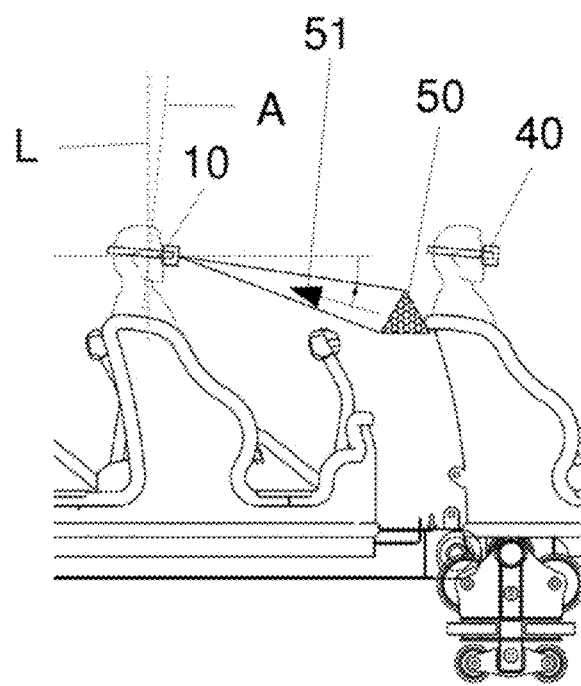
FIG. 2 shows an exemplary embodiment of a fairground ride with passengers wearing a virtual reality headset whose alignment is being determined.

The determination of the alignment of the virtual reality headset 10 is shown in FIG. 2. An alignment sensor 50 is arranged relative to the direction of travel on the back side of a vehicle 22. This alignment sensor 50 is recognized by the passenger 23, who is sitting in a vehicle behind the vehicle 22 with the alignment sensor 50 in his front field of view even when the passenger is not looking precisely in the direction straight ahead. The alignment sensor 50 can, e.g. be a quick response code or a barcode. An alignment signal 51 is formed here by reflections of the quick response code or of the barcode. The alignment signal 51 can be perceived by an apparatus 60, for example a camera which is integrated in the virtual reality headset 10.

Figure 3:
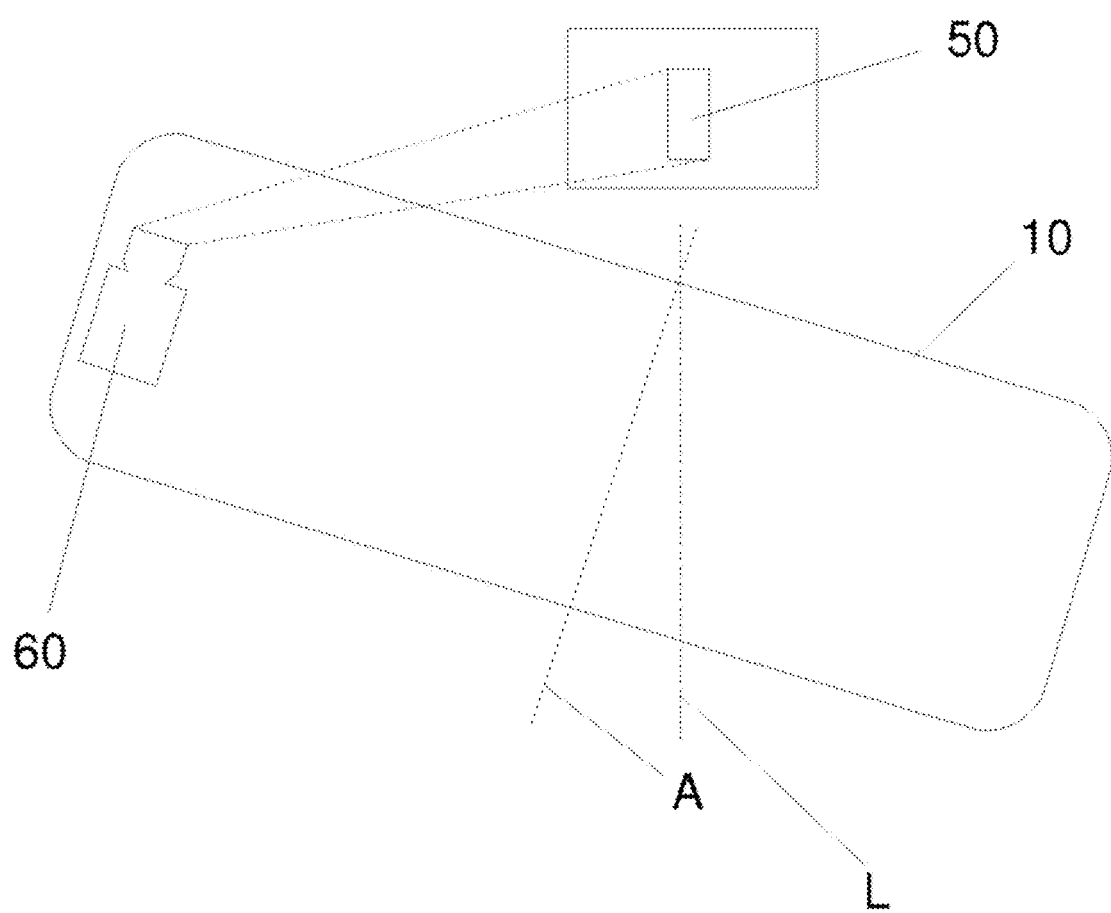
FIG. 3 shows a schematic representation of an exemplary embodiment of the method for the alignment of the virtual reality headset.

FIG. 3 shows how the position of a vertical axis A can be determined relative to a vertical direction L using a comparison of the actual alignment of the alignment sensor 50 with the alignment of the alignment sensor 50 perceived by the apparatus 60 in the virtual reality headset 10 which can deviate, for example, from the actual alignment by an inclination of the passenger 22 to the side. The alignment of the virtual reality relative to the actual reality can be determined by the knowledge of the position of the vertical axis A of the virtual reality headset 10 in the coordinate system firmly associated with the passenger and of the vertical direction L. Each vehicle 22 is advantageously associated with its own quick response code or barcode. Therefore, not only the alignment of the virtual reality headset 10 but at the same time also the position of the virtual reality headset 10 can be determined.

The cameras 60 can be realized, for example, by a smart phone built into the virtual reality headset 10. The cameras 60 may be configured to capture media content within a viewing range of the cameras 60 and, in certain embodiments, may be configured to analyze the media content to determine the alignment of the virtual reality headsets relative to the alignment sensors 50 and/or other devices and components of the fairground ride 20.

Another solution for determining the position of the virtual reality headset and its alignment is the using of so-called motion capture systems. Here the virtual reality headset 10 is provided either with passive markers, for example, optical or magnetic markers, or active markers in the sense of self-illuminating markers which are detected by an apparatus which can detect the movements, that is, a motion capture system. Using this data, a data processing system in the waiting station or on board the fairground ride 20 can transmit to each virtual reality headset 10 by radio, for example, by Bluetooth or WLAN, at which position and in which alignment it is precisely located.

The systems and methods disclosed herein may include additional functionality and features. For example, the operative functions of the system 100 and method may be configured to execute on a special-purpose processor specifically configured to carry out the operations provided by the system 100 and method. Notably, the operative features and functionality provided by the system 100 and method may increase the efficiency of computing devices that are being utilized to facilitate the functionality provided by the system 100 and the various methods disclosed herein. For example, by utilizing the virtual reality headsets 10 to determine the their own alignment with respect to the alignment sensors 50 and/or direction of travel, a reduced amount of computer operations and calculations need to be than if the virtual reality headsets 10 would have to transmit alignment signals to a calculating unit of the fairground ride 20 in which the alignment for each individual virtual reality headset 10 must be first calculated. In such a context, less processing power needs to be utilized because a separate calculating unit and/or computing device does not need to be utilized to determine the alignment. As a result, there are substantial savings in the usage of computer resources by utilizing the software and functionality provided in the present disclosure. In certain embodiments, various operative functionality of the system 100 may be configured to execute on one or more graphics processors and/or application specific integrated processors. For example, the rendering of the virtual reality may be performed on the graphics processors, and, in certain embodiments, as the system 100 learns over time various user preferences and/or actions conducted by passengers 23 of the fairground ride 20 and/or system 100, artificial intelligence and/or machine learning algorithms facilitating such learning may also be executed on graphics processors and/or application specific integrated processors.

Notably, in certain embodiments, various functions and features of the system 100 and methods may operate without any human intervention and may be conducted entirely by computing devices. In certain embodiments, for example, numerous computing devices may interact with devices of the system 100 to provide the functionality supported by the fairground ride 20 and/or the system 100. Additionally, in certain embodiments, the computing devices of the system 100 may operate continuously and without human intervention to reduce the possibility of errors being introduced into the system 100, such as, but not limited to, errors associated with aligning the virtual reality with the actual reality. In certain embodiments, the system 100 and methods may also provide effective computing resource management by utilizing the features and functions described in the present disclosure. For example, in certain embodiments, upon processing the alignment and/or position signals, any device in the system 100 may transmit a signal to a computing device receiving or processing the signals that only a specific quantity of computer processor resources (e.g. processor clock cycles, processor speed, etc.) may be devoted to processing the signals, any other operation conducted by the system 100, or any combination thereof. For example, the signal may indicate a number of processor cycles of a processor may be utilized to process the alignment and/or position signals, and/or specify a selected amount of processing power that may be dedicated to processing the alignment and/or position signals or any of the operations performed by the system 100. In certain embodiments, a signal indicating the specific amount of computer processor resources or computer memory resources to be utilized for performing an operation of the system 100, the virtual reality headsets 10, and/or fairground ride 20 may be transmitted from the first user device 102 to the various components of the system 100.

In certain embodiments, any device in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and methods at time periods when usage of processing resources and/or memory resources in the system 100 is at a selected value or below a selected value. In certain embodiments, the system 100 and methods may include transmitting signals to the memory devices utilized in the system 100, which indicate which specific sections of the memory should be utilized to store any of the data utilized or generated by the system 100. Notably, the signals transmitted to the processors and memories may be utilized to optimize the usage of computing resources while executing the operations conducted by the system 100. As a result, such functionality provides substantial operational efficiencies and improvements over existing technologies.

Figure 4:
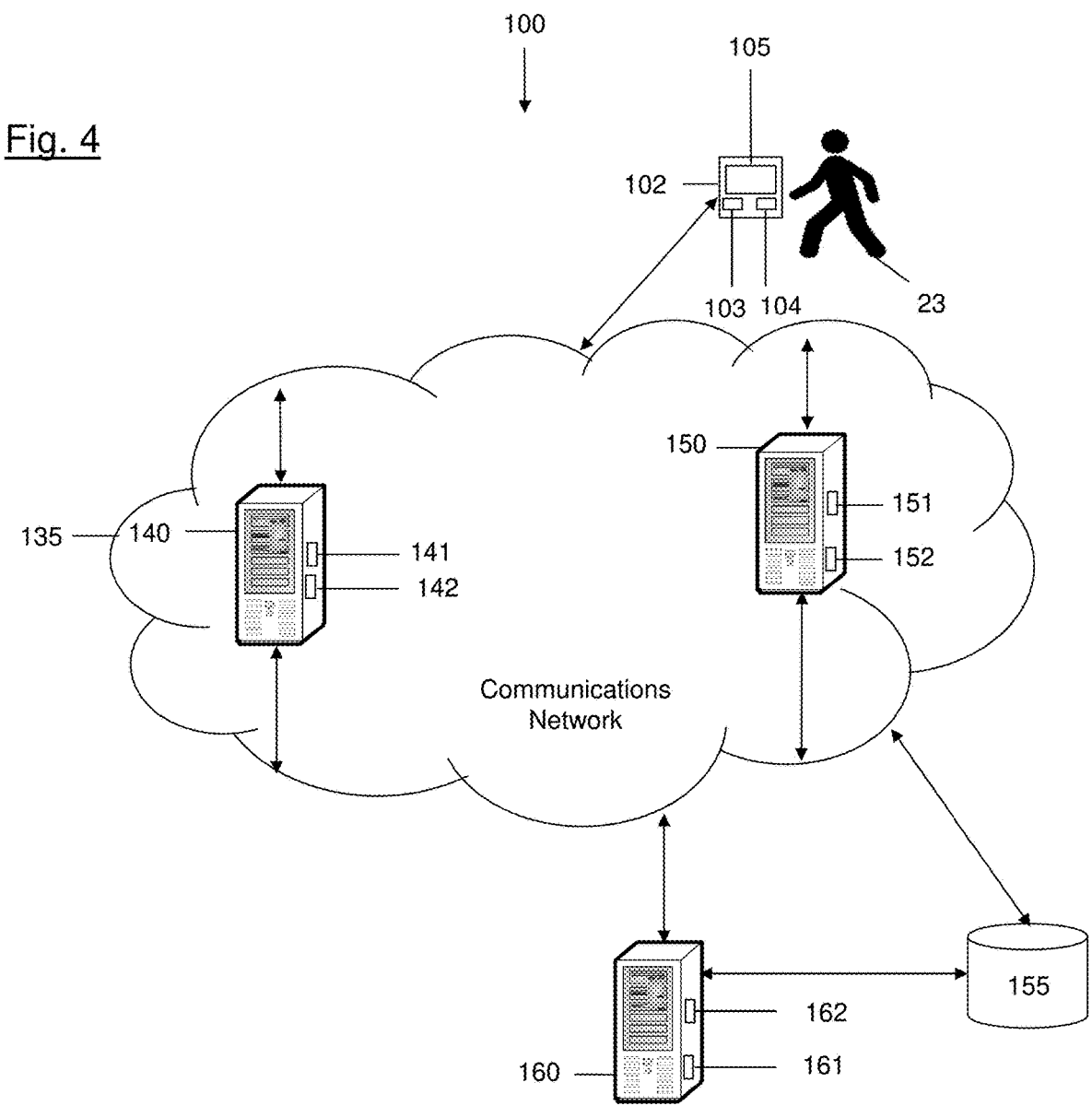
FIG. 4 illustrates a schematic diagram of a system, which facilitates the operation of a virtual reality headset and fairground ride, such as are shown in FIGS. 1-3.

Referring now also to FIG. 4, a system 100 for facilitating the operative functionality provided by the present disclosure is schematically illustrated. The system 100 may include the passenger 23, who may utilize one or more first user devices 102. The first user device 102 may include, but is not limited to, a computer, a laptop, a tablet device, a phablet, a server, a mobile device, a smartphone, a smart watch, and/or any other type of computing device. The first user device 102 utilized by the passenger 23 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102, to interact with various applications executing within the system 100, and to interact with the system 100. Illustratively, the first user device 102 is shown as a mobile device in FIG. 4. The first user device 102 may also include a global positioning system (GPS), which may include a GPS receiver and any other necessary components for enabling GPS functionality. The GPS may be utilized to determine the location of the passenger 23 and/or virtual reality headset 10 with respect to the fairground ride 20 and/or other points of reference. In certain embodiments, the first user device 102 may be configured to be inserted into a receptacle of a virtual reality headset 20 and may be configured to include the camera 60. In certain embodiments, the first user device 102 may be configured to attach to a portion of the virtual reality headset 20, such as via a fastening mechanism, such as, but not limited to, a clamp, hook, attachment device, any type of fastening mechanism, or a combination thereof.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135, such as, but not limited to, the virtual reality headsets 10, the fairground ride 20, the camera 60, the sensors 30, the receivers 40, and/or any other device and/or component of the system 100. Additionally, the communications network 135 may be configured to transmit, generate, and receive any information and data traversing the system 100. In certain embodiments, the communications network 135 may include any number of servers, databases, or other componentry, and may be controlled by a service provider. The communications network 135 may also include and be connected to a short-range wireless communications network (e.g. Bluetooth network), WLAN networks, optical networks, infrared-based networks, a cloud-computing network, a phone network, a wireless network, an Ethernet network, a satellite network, a broadband network, a cellular network, a private network, a cable network, the Internet, an internet protocol network, a content distribution network, any network, or any combination thereof. Illustratively, server 140, and server 150 are shown as residing within communications network 135.

Notably, the functionality of the system 100 may be supported and executed by using any combination of the servers 140, 150, and 160. The servers 140, and 150 may reside in communications network 135, however, in certain embodiments, the servers 140, 150 may reside outside communications network 135. The servers 140 and 150 may be utilized to perform the various operations and functions provided by the system 100, such as those conducted by the virtual reality headsets 10. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 150 may include a memory 151 that includes instructions, and a processor 152 that executes the instructions from the memory 151 to perform the various operations that are performed by the server 150. In certain embodiments, the servers 140, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 150 may be communicatively linked to the communications network 135, any network, any device in the system 100, or any combination thereof. In certain embodiments, the servers 140, 150 may process any data, information, and/or measurements provided by any of the components in the system 100.

The database 155 of the system 100 may be utilized to store and relay information that traverses the system 100, cache information and/or content that traverses the system 100, store data about each of the devices in the system 100, and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the servers 140, 150, 160, the first user device 102, virtual reality headsets 10, the sensors 30, the receiver 40, the fairground ride 20, the vehicles 22, the apparatus 60, any devices in the system 100, any other device, any network, or any combination thereof.

The database 155 may also store information obtained from the system 100, store information associated with the passengers 23, store location, position and/or alignment information for the first user device 102, the virtual reality headsets 10, and/or sensors 30, store location information for the vehicles 22, store user profiles associated with the passengers 23, store device profiles associated with any device in the system 100, store communications traversing the system 100, store user preferences, store information associated with any device or signal in the system 100, store information relating to usage of applications accessed by the passengers 23, store any information obtained from any of the networks in the system 100, store historical data associated with the passengers 23 and/or fairground ride 20, store device characteristics, store information relating to any devices associated with the passengers 23, or any combination thereof. The database 155 may store virtual reality content, position signals and information, alignment signals and information, calculations performed by the virtual reality headsets 10, any other information generated according to the present disclosure, any other information or content, or any combination thereof. In certain embodiments, the database 155 may be configured to store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, rendering the virtual reality, calculating positions and alignments of the virtual reality headsets 10 from the position and/or alignment signals; generating the virtual reality content for the virtual reality; synchronizing virtual reality content with actual reality content; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Referring now also to FIG. 5, at least a portion of the methodologies and techniques described with respect to the exemplary embodiments of the system 100 can incorporate a machine, such as, but not limited to, computer system 500, or other computing device within which a set of instructions, when executed, may cause the machine to perform any one or more of the methodologies or functions discussed above. The machine may be configured to facilitate various operations conducted by the system 100, the fairground ride 20, the virtual reality headset 10, the sensors 30, the apparatus 60, any device in FIGS. 1-5, or a combination thereof. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the virtual reality headsets 10, the sensors 30, the apparatus 60, the fairground ride 20, the server 140, the server 150, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510, which may be, but is not limited to, a liquid crystal display (LCD), a flat panel, a solid state display, or a cathode ray tube (CRT). The computer system 500 may include an input device 512, such as, but not limited to, a keyboard, a cursor control device 514, such as, but not limited to, a mouse, a disk drive unit 516, a signal generation device 518, such as, but not limited to, a speaker or remote control, and a network interface device 520.

The disk drive unit 516 may include a machine-readable medium 522 on which is stored one or more sets of instructions 524, such as, but not limited to, software embodying any one or more of the methodologies or functions described herein, including those methods illustrated above. The instructions 524 may also reside, completely or at least partially, within the main memory 504, the static memory 506, or within the processor 502, or a combination thereof, during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 522 containing instructions 524 so that a device connected to the communications network 135, another network, or a combination thereof, can send or receive voice, video or data, and communicate over the communications network 135, another network, or a combination thereof, using the instructions. The instructions 524 may further be transmitted or received over the communications network 135, another network, or a combination thereof, via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

LIST OF REFERENCE NUMERALS 10 virtual reality headset
20 fairground ride
22 vehicle
23 passenger
30 position sensor
31 position signal
40 receiver
41 received signal
60 apparatus
A vertical axis
L vertical direction
100 system
102 first user device
103 processor
104 memory
105 interface
communications network 135
server 140
processor 141
memory 142
server 150
processor 151
memory 152
database 155
server 160
processor 161
memory 162

The invention claimed is:

1. A method for determining a position of a virtual reality headset in a vehicle moving along a travel stretch of a fairground ride, comprising:
receiving a passenger on whom the virtual reality headset is placed during a trip with the vehicle,
generating, during an operation of the fairground ride in an actual reality, a virtual reality corresponding to the fairground ride with the vehicle, wherein the virtual reality is represented on the virtual reality headset,
wherein the fairground ride comprises a sensor from which a position signal emanates,
wherein the virtual reality headset is a mobile virtual reality headset,
wherein the virtual reality headset comprises a receiver which evaluates an amplitude of the position signal, a frequency of the position signal, a signal strength of the position signal of the sensor, or a combination thereof to facilitate in determining the position of the virtual reality headset in the vehicle relative to the sensor,
wherein an alignment of the virtual reality relative to the actual reality is determined by the virtual reality headset based on a position of a vertical axis of the virtual reality headset relative to a vertical direction based on an inclination of a head of the passenger, wherein the position of the vertical axis relative to the vertical direction is determined based on a comparison of an actual alignment of an alignment sensor of the fairground ride with an alignment of the alignment sensor as perceived by the virtual reality headset,
and the virtual reality headset comprises a communication interface via which a data connection takes place between the virtual reality headset and a data processing device of the fairground ride, wherein the communication interface is detachable, wireless, or a combination thereof.

2. The method according to claim 1, further comprising determining the position and an alignment of the virtual reality headset by utilizing a motion capture system.

3. The method according to claim 1, wherein the sensor is a position sensor and an alignment sensor.

4. The method according to claim 1, wherein the fairground ride comprises at least three sensors.

5. The method according to claim 1, wherein the position signal comprises a Bluetooth signal, a WLAN signal, an optical signal, an infrared signal, a signal corresponding to quick response codes or barcodes, a magnetic signal, a combination thereof, or other radio signals.

6. The method according to claim 1, wherein the sensor comprises a plurality of sensors which are arranged on a stationary position of the fairground ride, on the vehicle, or a combination thereof.

7. The method according to claim 1, wherein a camera is integrated in the virtual reality headset.

8. The method according to claim 1, wherein a mobile computing device is insertable into the virtual reality headset.

9. The method according to claim 8, wherein at least one electrical component of the mobile computing device is insertable into the virtual reality headset.

10. The method according to claim 1,
wherein the virtual reality headset comprises a marker which emits a tracking signal or functions upon passive action,
wherein the fairground ride comprises a tracking apparatus for detecting a movement of the marker,
wherein the position, and alignment, or a combination thereof, of the virtual reality headset relative to the tracking apparatus is determined using the movement of the marker detected by the tracking apparatus.

11. The method according to claim 10, wherein the tracking signal is an optical signal, a magnetic signal, an acoustic signal, or a combination thereof.

12. The method of claim 1, wherein the method is performed by utilizing the fairground ride.

13. A method for an alignment of at least one virtual reality headset in a vehicle moving along a travel stretch of a fairground ride,
receiving a passenger on whom the virtual reality headset is placed during a trip with the vehicle,
generating, during an operation of the fairground ride in an actual reality, a virtual reality corresponding to the fairground ride with the vehicle, wherein the virtual reality is represented on the virtual reality headset,
the fairground ride comprises an alignment sensor from which an alignment signal emanates,
wherein the virtual reality headset is a mobile virtual reality headset,
wherein the virtual reality headset comprises an apparatus which evaluates from an amplitude of the alignment signal, a frequency of the alignment signal, a signal strength of the alignment signal of the alignment sensor, or a combination thereof, to facilitate in determining the alignment of the virtual reality headset in the virtual reality relative to the alignment sensor,
wherein an alignment of the virtual reality relative to the actual reality is determined based on a comparison of an actual alignment of the alignment sensor with an alignment of the alignment sensor as perceived by the virtual reality headset,
and the virtual reality headset comprises communication interface via which a data connection takes place between the virtual reality headset and a data processing device of the fairground ride, wherein the communication interface is detachable, wireless, or a combination thereof.

14. The method according to claim 13, wherein the alignment signal comprises optical, infrared, quick response codes or barcodes.

15. A fairground ride, comprising:
a travel stretch,
a vehicle which moves along the travel stretch,
a sensor from which a position signal or an alignment signal emanates,
a virtual reality headset that performs an operation comprising:
generating, during an operation of the fairground ride in actual reality, a virtual reality corresponding to travel with the vehicle, wherein the virtual reality is represented on the virtual reality headset,
wherein the virtual reality headset is a mobile virtual headset,
wherein the virtual reality headset comprises a receiver an apparatus, or a combination thereof,
wherein the virtual reality headset has a communication interface via which a data connection takes place between the virtual reality headset and a data processing device of the fairground ride, wherein the communication interface is detachable, wireless, or a combination thereof,
wherein the virtual reality headset performs a further operation comprising determining a position, an alignment, or a combination thereof, of the virtual reality headset using an amplitude, a frequency, a signal strength, or a combination thereof, of the position signal, the alignment signal, or a combination thereof; and
wherein an alignment of the virtual reality relative to the actual reality is determined by the virtual reality headset based on a position of a vertical axis of the virtual reality headset relative to a vertical direction based on an inclination of the passenger.

16. The fairground ride of claim 15, further comprising a motion capture system that determines the position and the alignment of the virtual reality headset.

17. The fairground ride of claim 15, further comprising a marker which emits a tracking signal or functions upon passive action.

18. The fairground ride of claim 15, wherein the sensor comprises a position sensor, an alignment sensor, or a combination thereof.

19. The fairground ride of claim 15, wherein the alignment of the virtual reality relative to the actual reality is determined based on the position of the vertical axis of the virtual reality headset in a coordinate system associated with the passenger and of the vertical direction.

20. The fairground ride of claim 15, further comprise a tracking apparatus for detecting a movement of a marker of the fairground ride.

* * * * *